UNITED STATES PATENT OFFICE.

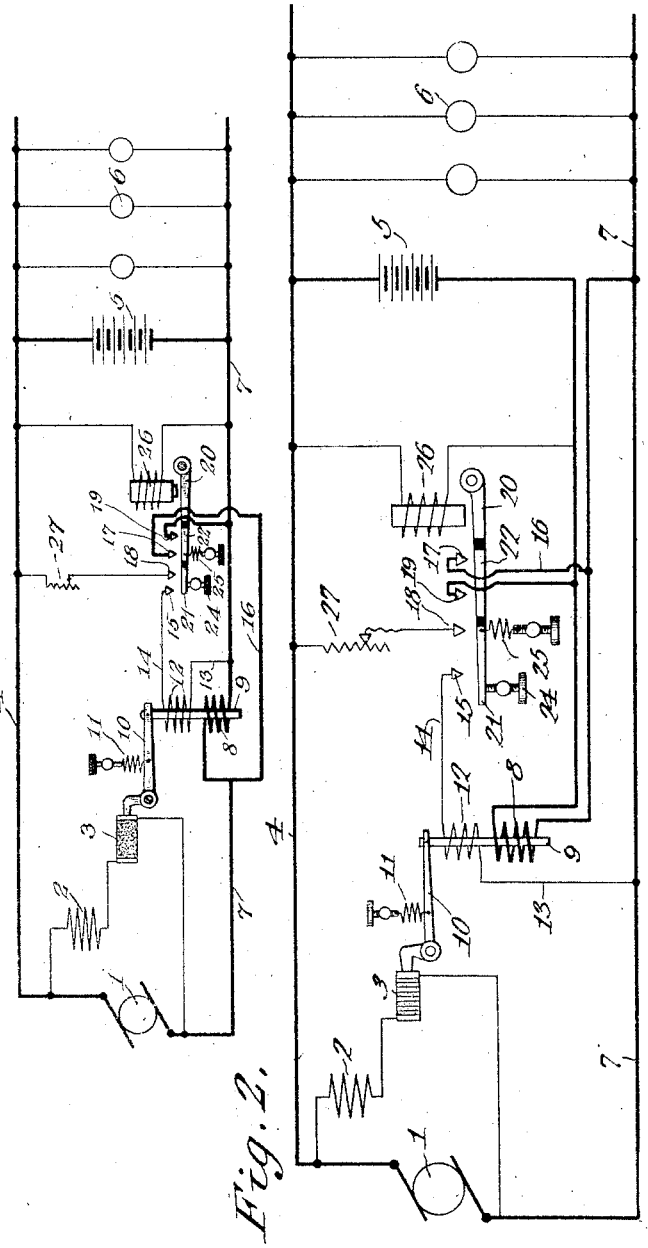

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,008,243. Specification of Letters Patent. Patented Nov. 7, 1911.

Application filed November 21, 1910. Serial No. 593,319.

*To all whom it may concern:*

Be it known that I, JOHN L. CREVELING, a resident of the city, county, and State of New York, have invented certain new and useful Improvements in Electric Regulation, as set forth in the annexed specification and drawing forming a part thereof.

My invention pertains to that class of electric regulation wherein it is desired to automatically regulate a dynamo or generator in a predetermined manner.

My invention has for its particular object to provide means whereby a dynamo or generator may be automatically governed or controlled in such manner as to properly charge a storage battery and operate lamps or translating devices.

Figure 1 is a diagrammatic representation of one type of system embodying the essentials of my invention. Fig. 2 is a diagrammatic representation of a slightly modified form of system embodying my invention.

In the drawing, referring particularly to Fig. 1 1 represents a dynamo or generator provided with the usual field coil 2 having in series therewith a regulating element in this instance indicated as a carbon pile 3. 4 represents the positive lead of the generator which is connected with one side of the storage battery 5 and one side of the lamps or other translating devices indicated at 6. The remaining terminals of the battery 5 and translating devices 6 are carried to the lead 7 which is led through series coil 8 to the negative side of the generator. The coil 8 surrounds the core 9 of magnetic material, in such manner that when energized, it tends to draw the same in a downward direction. The core 9 is carried by the bell crank lever 10, normally drawn in an upward direction as by the adjustable spring 11 in such manner as to tend to compress the carbon pile 3 and lower the resistance thereof. 12 is a coil of fine wire surrounding the core 9 and having one of its ends connected with the lead 7 as by wire 13 and the other end connected as by wire 14 with the switch contact 15. 16 is a coarse wire carried from a point of the lead 7 between the generator and the coil 8, to the switch contact 17. Switch contact 18 is connected with the lead 4 and the switch contact 19 is connected with the lead 7 as indicated. 20 is an armature provided with contacts 21 and 22 electrically insulated from each other and normally drawn in a downward direction against the adjustable stop 24 as by adjustable spring 25. The contacts 21 and 22 are so arranged that when lever 20 is raised they will cause electrical communication between 15 and 18 and between 17 and 19. 26 is an electromagnet in shunt to the battery 5, which, when energized, tends to lift the lever 20. 27 is an adjustable resistance in series with the circuit containing the coil 12 whereby the current in said coil may be adjusted.

The operation of my invention when embodied in a system as herein shown in Fig. 1 for illustration is substantially as follows:—Starting with the generator charging the batteries which we will consider as below their normal voltage, current will flow from the generator, through the field 2 and carbon pile 3 in a well known manner and the voltage of the generator will depend upon the resistance of the carbon pile 3. Current will flow from the generator through lead 4, storage battery 5 and translating devices 6 if they be in circuit and return to the generator through lead 7 and coil 8. I now so adjust the spring 11 that when the maximum current desired to have furnished by the generator is reached, the coil 8 will cause the core 9 to be drawn downwardly so as to increase the resistance 3 and thus regulate the generator voltage so that this maximum current will not be exceeded. If now, the generator continue to supply this current and thus charge the battery, the voltage upon the battery will gradually rise. This will cause a rise in current in the magnet 26 inasmuch as the same is in shunt across the circuit and I so adjust the spring 25 that when the maximum desired voltage across the battery, for example substantially its fully charged voltage, be reached, the coil 26 will lift the armature 20 against the action of spring 25 and close the contacts 15, 21, 18 and 17, 22, 19. This will shunt out the current regulating coil 8 and throw the voltage regulating coil 12 in circuit across the battery and generator. I now so adjust the adjustable resistance 27 that the current in the voltage coil 12, with the maximum desired voltage across the line will cause the coil 12 to exert a substantially equal pull upon the core 9 as did the coil 8 when the maximum current was flowing therethrough. Under these conditions, the voltage coil 12 will hold this maximum preferred voltage across the generator regardless of the current delivered by the generator. The batteries now charging across this constant voltage circuit will have their charging current gradually tapered off to zero as their voltage rises.

From the foregoing, it will be plain that I have produced a system wherein the storage batteries may be automatically charged at a constant rate or under current control until a certain desired voltage is reached, when the current controlling feature is suppressed or rendered inoperative and the regulator becomes a voltage regulator charging the batteries on a constant voltage circuit.

It will be obvious that the coil 8 may be placed in series with the battery connection to the main circuit as shown in Fig. 2 instead of in series with the main circuit and then the current control of the generator will depend upon current delivered to the battery instead of the total current delivered by the generator, or the coil 8 may be placed in series with any circuit, the current in which it is desired to make a regulating factor of the generator.

I do not wish in any way to limit myself to the exact details of the system shown in the drawing submitted herewith as a mere diagrammatic representation of one type of system embodying my invention nor to the exact mode of operation outlined as a description of this diagrammatic system used for illustration merely, as it will be plain that wide departure in the way of details of construction and operation may be made without departing from the scope of my invention, which is as set forth in the following claims:—

1. Means for regulating a generator comprehending current regulating means, voltage regulating means and means for rendering one of the above mentioned regulating means operative and the other inoperative.

2. Means for regulating a generator comprehending current regulating means, voltage regulating means and means for rendering one of the above mentioned regulating means operative and the other inoperative depending upon the voltage of the generator.

3. Means for regulating a generator comprehending current regulating means, voltage regulating means and means for rendering one of the above mentioned regulating means operative and the other inoperative, depending upon the voltage of a circuit supplied by the generator.

4. Means for regulating a generator comprehending current regulating means, voltage regulating means and means for maintaining one only of the above regulating means operative.

5. The combination with a generator and a supply circuit of means for regulating the generator comprising means responsive to current changes in said supply circuit and means responsive to voltage changes across said supply circuit and automatic means for selecting which of said operating means shall be operative.

6. The combination with a generator and a supply circuit of means for regulating the generator comprising means responsive to current changes in said supply circuit and means responsive to voltage changes across said supply circuit and automatic means for selecting which of said operating means shall be operative depending upon the voltage across the supply circuit.

7. Means for regulating a generator comprehending a current coil and a voltage coil, and automatic means for determining which of said coils shall regulate the generator.

8. Means for regulating a generator comprehending a current coil and a voltage coil, and automatic means for determining which of said coils shall predominate in the regulation of the generator throughout changes in its operation.

9. Means for regulating a generator comprehending a current coil and a voltage coil, and voltage operated means for determining which of said coils shall regulate the generator.

10. Means for regulating a generator comprehending a current coil and a voltage coil, and voltage operated means for determining which of said coils shall predominate in the regulation of the generator throughout changes in its operation.

11. The combination with a generator of regulating means, comprehending means for holding the current output constant, and means for holding the voltage constant, and automatic means for determining which of said means shall effect the regulation of the generator throughout changes in its operation.

12. The combination with a generator and regulating means therefor, of means for affecting the regulating means responsive to current fluctuations, means for affecting the regulating means responsive to voltage fluctuations and automatic means for controlling the current in both of said operating means.

13. The combination with a source of electromotive force, a supply circuit and a storage battery, of means for regulating said electromotive force, current operated means for controlling the regulating means, voltage operated means for controlling the regulating means, and automatic means depending upon conditions of the supply circuit for determining which of said controlling means shall be operative.

14. The combination with a source of electromotive force, a supply circuit and a storage battery, of means for regulating said electromotive force, current operated means for controlling the regulating means, voltage operated means for controlling the regulating means, and automatic means depending upon conditions of the supply circuit for affecting the operativeness of both said controlling means.

15. The combination with a source of electromotive force and a supply circuit of means for regulating said electromotive force, operating means for said regulating means responsive to fluctuations in current, operating means for said regulating means responsive to voltage fluctuations, and automatic means for determining which of said operating means shall predominate in the regulation of said electromotive force upon tendencies of the same to vary.

16. The combination with a source of electromotive force, of means for effecting current regulation of said electromotive force, means for effecting voltage regulation of said electromotive force, and supplemental means for automatically determining which of said before mentioned means shall regulate the said electromotive force.

17. The combination with a source of electromotive force, means for regulating the same affected by current due to said electromotive force and affected by voltage fluctuations at said source, of automatic means for determining whether the said electromotive force be governed in response to current or voltage fluctuations.

18. The combination with means for maintaining a difference of electrical potential, of means for regulating said difference of potential comprehending current responsive means, voltage responsive means and means for determining which of said responsive means shall predominate in the regulation of said difference of potential.

19. The combination with means for maintaining a difference of electrical potential, of means for regulating said difference of potential comprehending current responsive means and voltage responsive means and means for determining which of said responsive means shall regulate said difference of potential.

20. The combination with means for maintaining a difference of electrical potential, of means for regulating said difference of potential comprehending a voltage responsive coil, a current responsive coil and automatic means for affecting the current in both said coils.

21. The combination of means for maintaining a difference of electrical potential, of means for regulating said difference of potential comprehending a current coil, a voltage coil, and automatic means for determining which of said coils shall predominate in the regulation of said difference of potential throughout tendencies to change.

22. The combination with a generator, of means for regulating the same comprehending a current coil, a voltage coil, and automatic means for varying the operative effects of both said coils.

23. The combination with a generator, of means for regulating the same and providing both current and voltage regulation ther for and automatic means for determining whether the generator shall be current regulated or voltage regulated.

24. The combination with a generator, an external circuit, and means for utilizing current therein, of means for regulating the generator comprehending means responsive to current fluctuations in said circuit, means responsive to voltage fluctuations across said circuit and automatic means for determining which of said responsive means shall predominate in the regulation of said generator.

25. The combination with a generator and a supply circuit, of a regulator for the generator comprising a coil in series with the supply circuit, a coil in shunt across the supply circuit, and automatic means for increasing the operativeness of the shunt coil and decreasing the operativeness of the series coil.

JOHN L. CREVELING.

Witnesses:
M. HERSKOVITZ,
A. E. TUERS.